US009576433B2

(12) United States Patent
Kim et al.

(10) Patent No.: US 9,576,433 B2
(45) Date of Patent: Feb. 21, 2017

(54) METHOD AND SYSTEM TO REPLACE A BETTING ACTION IN ADVANCE OF A USER TURN IN VIRTUAL CARD GAME SERVICES

(75) Inventors: Ki Yong Kim, Gyeonggi-do (KR); Tae Jong Lee, Seoul (KR)

(73) Assignee: NHN Entertainment Corporation, Seongnam-si (KR)

( * ) Notice: Subject to any disclaimer, the term of this patent is extended or adjusted under 35 U.S.C. 154(b) by 1323 days.

(21) Appl. No.: 12/124,241

(22) Filed: May 21, 2008

(65) Prior Publication Data

US 2008/0293471 A1 Nov. 27, 2008

(30) Foreign Application Priority Data

May 21, 2007 (KR) ........................ 10-2007-0048978

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***A63F 1/00*** | (2006.01) |
| ***A63F 9/20*** | (2006.01) |
| ***G07F 17/32*** | (2006.01) |

(52) U.S. Cl.
CPC ........... *G07F 17/3276* (2013.01); *G07F 17/32* (2013.01); *G07F 17/3293* (2013.01)

(58) Field of Classification Search
CPC ........................................................ G06F 17/32
USPC .................... 463/11-13, 16, 20, 42; 273/292
See application file for complete search history.

(56) References Cited

U.S. PATENT DOCUMENTS

| | | | | |
|---|---|---|---|---|
| 6,663,486 | B2 * | 12/2003 | D'Aurora et al. | 463/12 |
| 7,585,217 | B2 * | 9/2009 | Lutnick et al. | 463/16 |
| 7,658,672 | B1 * | 2/2010 | Wolf et al. | 463/13 |
| 2002/0010022 | A1 * | 1/2002 | Vincent | 463/42 |
| 2002/0019253 | A1 * | 2/2002 | Reitzen | G07F 17/32 463/16 |
| 2002/0094869 | A1 * | 7/2002 | Harkham | 463/42 |
| 2002/0142825 | A1 * | 10/2002 | Lark et al. | 463/16 |
| 2003/0090063 | A1 * | 5/2003 | Jarvis et al. | 273/292 |
| 2004/0185933 | A1 * | 9/2004 | Nicely | 463/25 |
| 2004/0242297 | A1 * | 12/2004 | Walker et al. | 463/13 |
| 2005/0282603 | A1 * | 12/2005 | Parrott et al. | 463/1 |
| 2006/0014577 | A1 * | 1/2006 | Snow | 463/12 |

(Continued)

FOREIGN PATENT DOCUMENTS

JP 2000-510352 8/2000

*Primary Examiner* — Omkar Deodhar
*Assistant Examiner* — Wei Lee
(74) *Attorney, Agent, or Firm* — H.C. Park & Associates, PLC

(57) ABSTRACT

Disclosed herein are a method and system for providing card game services. The method includes entering a virtually implemented game room to play a card game provided over the Internet, participating in the card game according to predetermined rules of the card game, setting a betting action depending on a situation of the card game in advance during the card game, and playing the game by automatically entering the set betting action on a relevant turn. The system includes at least one user terminal for playing a card game over an Internet, and a game provision server for implementing a virtual game room, enabling a betting action to be selected during the game through input from the user terminal, and automatically taking the selected betting action on a relevant turn.

15 Claims, 7 Drawing Sheets

(56) References Cited

U.S. PATENT DOCUMENTS

2006/0068864 A1* 3/2006 White et al. .................... 463/13

* cited by examiner

METHOD AND SYSTEM TO REPLACE A BETTING ACTION IN ADVANCE OF A USER TURN IN VIRTUAL CARD GAME SERVICES

CROSS-REFERENCE TO RELATED APPLICATION

This application claims the benefit of Korean Patent Application No. 10-2007-0048978, filed on May 21, 2007, in the Korean Intellectual Property Office, the disclosure of which is incorporated herein by reference.

BACKGROUND OF THE INVENTION

1. Field of the Invention

The present invention relates generally to a method and system for providing card game services, and, more particularly, to a method and system for providing card game services, which enables a betting action, which will be taken on a relevant turn, to be scheduled depending on the situation of a game in advance during the game, thereby increasing the speed of the game.

2. Description of the Related Art

Recently, with the development of communication and network technology, various types of content provision services using the Internet, such as chatting services, services for communities of like-minded persons, game services and shopping mall services, have been provided. Of such various types of content provision services, game provision services are trending toward rapid increases in the speed of the development of service and in the speed of the popularization of service due to the expansion of consumers.

In step with the trend, portal sites and online game service providers have provided various types of games in which games can be played between different gamers over computer networks in real time, such as Go-Stop, poker, racing games, fighting games and Role Playing Games (RPGs).

Of the various types of games, card games have recruited many users due to the simple game playing methods thereof, and support various types of card games, such as Go-Stop, two-player Go-Stop, Hulla, poker, high-low and blackjack to satisfy the demand of many users. Such card games are generally played in the state in which the rules of games and the appearances of cards, commonly used offline, are adopted without change, or in the state in which some of the rules of games are modified or added in order to increase interest in the games. Furthermore, most card games include betting stages in which players bet predetermined amounts of money depending on cards they possess. With regard to betting rules, betting is also performed in the state in which offline betting rules are transferred without change or some offline betting rules are modified, like the general rules for playing cards.

Accordingly, respective players, participating in a game in a single game room, must sequentially take betting actions on their turns. As a result, in the case in which a plurality of players participates in a game, there is a problem in that an excessively long time is required for betting actions, thereby reducing interest in the game.

That is, each player, participating in a game, thinks of, determines and takes a betting action on his or her betting turn while viewing his or her and opponent players' cards. Even when a specific betting action has been determined to be taken, the betting action can be normally taken only when a betting button is pressed on a relevant turn and an input command reaches a server for processing a game. That is, an excessively long time is taken until a betting process is completed from the viewpoints of waiting players as well as a play on a relevant betting turn, so that there is a problem in that the sense of the speed of the game is deteriorated.

Furthermore, when an excessively long time is required in every betting stage because at least one betting stage is undertaken in a single card game, concentration on a game and continuation of a game suffer, thereby reducing interest in the game.

SUMMARY OF THE INVENTION

Accordingly, the present invention has been made keeping in mind the above problems occurring in the prior art, and an object of the present invention is to provide a method and system for providing card game services, which, in a card game that is played between different players over the Internet in real time, enable a betting action to be scheduled in a betting stage during the game and to be automatically taken on a relevant turn, thereby increasing the speed of the game and maintaining or increasing interest in the game.

Furthermore, another object of the present invention is to provide a method and system for providing card game services, which enable a betting action to be scheduled depending on the situation of a game in advance and to be changed in the case in which the situation of the game becomes different from that anticipated at the time of scheduling the betting action, thereby enabling game users to conveniently set betting actions.

In order to accomplish the above objects, the present invention provides a method of allowing users to enter a virtually implemented game room for playing a card game; providing a user interface to a user for allowing the user to establish at least one betting action depending on predetermined play situations of the card game; and permitting the user to selectively enter the at least one betting action.

The setting the betting action in advance includes providing a betting schedule setting box, showing one or more types of betting actions available for a current situation of the card game, and selecting any one betting action from among the shown types of betting actions through external input.

The showing one or more types of betting actions includes showing types of betting actions varying depending on a betting action of a higher-priority opponent player in the current situation of the game.

The user interface provides one or more betting actions available for a current play situation of the card game to the user, and allows the user to select a betting action from the available betting actions.

The automatically entering the betting action includes canceling the set betting action based on selection if a relevant situation of play of the game does not meet a condition for the betting action set before the relevant turn.

The user interface provides a list of predetermined play situations of the card game so that the user can establish at least one betting action by selecting at least one of the listed predetermined play situations. Alternatively, the user interface allows the user to make up own predetermined play situations for the at least one betting action.

Additionally, the present invention provides a computer-readable recording medium storing a program for executing any one of the methods.

Additionally, the present invention provides a system for providing card game services, including at least one memory having program instructions and databases, the databases including at least one predetermined game rule; means for connecting users to a virtually implemented game room for playing a card game; a user interface for allowing a user to establish at least one betting action depending on predetermined play situations of the card game; and means for permitting the user to selectively enter the at least one betting action.

The game provision server includes a betting scheduling module for implementing types of available betting actions depending on each situation of the game and displaying the types of betting actions on the user terminal.

The betting scheduling module cancels the betting action set through the input from the user terminal if a relevant situation of the game in which the user terminal participates does not meet a condition for a situation of play of the game corresponding to the betting action set in advance.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

Figure 1:
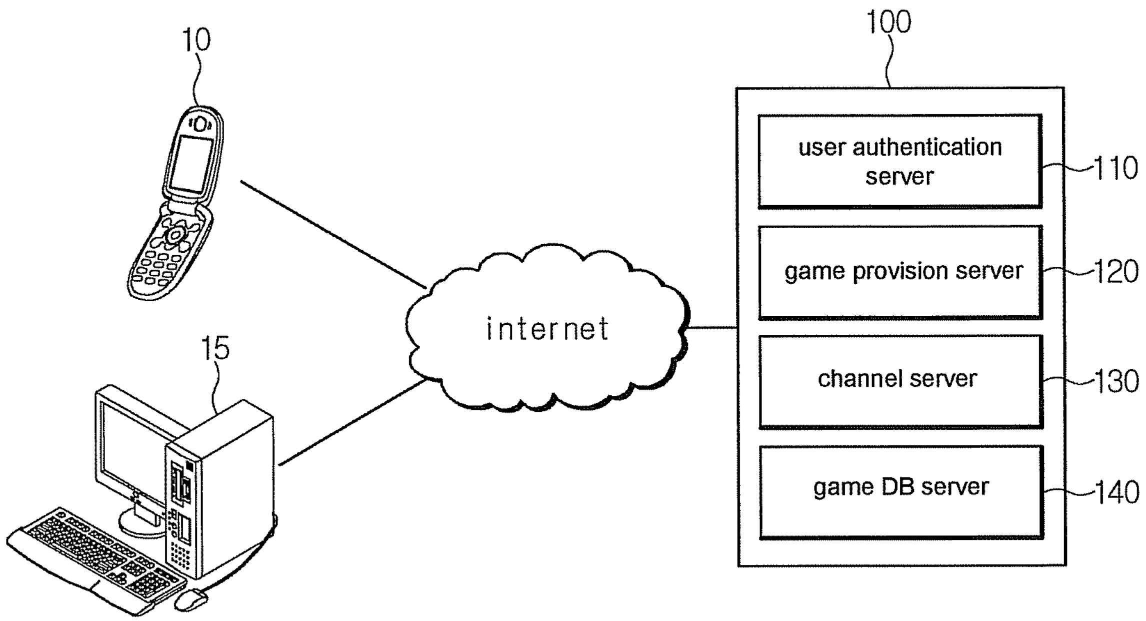
FIG. 1 is a block diagram schematically showing the configuration of a system for providing a card game service according to the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

Preferred embodiments of the present invention will be described with reference to the accompanying drawings. Although, in the present specification, the card game of the present invention is described using a poker game as an example when necessary, the present invention is not limited thereto. It is noted that a card game may be played over the Internet, and that the present invention may be applied to all game services as long as the game services enable specific amounts of game money to be bet in predetermined sequences and according to predetermined rules.

FIG. 1 is a block diagram schematically showing the configuration of a system for providing a card game service according to the present invention.

The system for providing a card game service according to the present invention basically includes user terminals 10 and 15 and a game server 100.

The user terminals 10 and 15 are devices capable of accessing the Internet and searching for, outputting, storing and creating information through the manipulation of a provided keyboard or mouse, and may include portable mobile communication devices 10, such as Personal Digital Assistants (PDAs) and mobile phones, with the development of mobile communication technology, as well as desktop computers and notebook computers 15.

Each of the user terminals 10 and 15 includes a control unit (not shown) for executing a user program according to a self-operative Operating System (OS) and processing relevant data and a wired or wireless communication module (not shown) for accessing the Internet.

The game server 100 implements web pages for providing game services, and provides games to users, who are authenticated as legitimate users through user authentication, when the user terminals 10 and 15 access a site through web browsers. For this purpose, the game server 100 may include a user authentication server 110, a game provision server 120, a channel server 130 and a game DB server 140, and the respective constituent servers may be constructed by physically integrating them in a single apparatus or by separating them as general network servers. A network server refers to a computer system that performs desired tasks by exchanging data with another server, connected to the same computer network, such as a private intranet or the Internet, through the computer network. In a broad sense, a network server may include various application programs, executed on the network server, and various databases, constructed within the network server.

Meanwhile, the game server 100 may be connected with a specific portal server and may be accessed through a portal site provided by a portal server. A portal site is a web site that appears first when a web browser is executed on a user terminal. Recently, such a portal site provides various services, such as a chatting service, a service for communities of like-minded persons, a message service, an e-mail service, a shopping mall service, a game service and a blog service, together, and the portal server realizes such a portal site.

The user authentication server 110 sends a web page for providing a game service to the user terminal 10 or 15 when the user terminal 10 or 15 accesses the game server 100 through a web browser. The sent web page presents various games provided through the game server 100, and provides a separate text field for user authentication. Accordingly, when authentication data, including an ID and a password, is entered in the text field for user authentication through the user terminal 10 or 15, the entered authentication data is sent to the user authentication server 110, and the user authentication server 110 compares the entered data with the ID and password data of respective members, and, if there is a match, determines that the user in question is a legitimate user and then resends an authenticated web page.

The game provision server 120 is a server for providing various game services that are provided when the user terminal 10 or 15 is authenticated as a legitimate user through the user authentication server 110. The game provision server 120 may be formed of separate servers for respective games. The game provision server 120 is accessed at the request of the user terminal 10 or 15, sets up a game room, aids in the performance of a game by supporting various functions, including a betting schedule setting function, in a game room, calculates the results of a game, and sends the results to the user terminal 10 or 15.

The channel server 130 updates and manages the channel lists of various games, such as Go-Stop, two-player Go- Stop, Hulla and poker, provided by the game server 100 and a list of game rooms for each channel, and sends the lists to the user terminal 10 or 15.

Furthermore, the game DB server 140 includes at least one game database to realize various game services provided by the game provision server 120. That is, the game DB server 140 organizes and stores various data related to each game in a database, and stores user data related to each game, such as a game level, possessed game money, records, the highest and lowest scores and the percentage of victories for each legitimate user.

Figure 2:
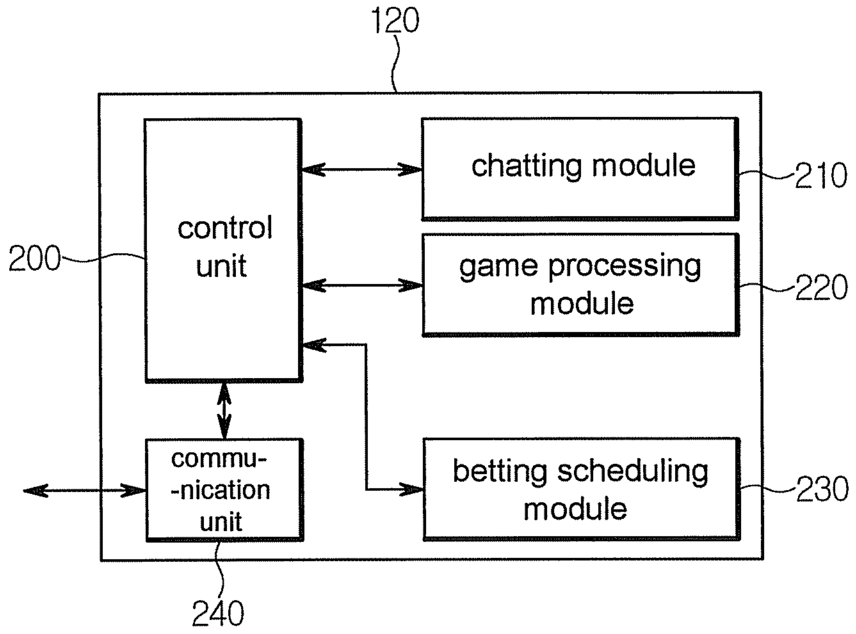
FIG. 2 is a block diagram showing the construction of a game provision server in the system for providing card game services according to a preferred embodiment of the present invention.

FIG. 2 is a block diagram showing the construction of the game provision server 120 in the system for providing card game services according to a preferred embodiment of the present invention.

Referring to FIG. 2, the game provision server 120 according to the preferred embodiment of the present invention includes a control unit 200, a communication unit 240, a chatting module 210, a game processing module 220, and a betting scheduling module 230.

The control unit 200 controls the situations of each game, such as the start performance and termination of the game, and controls the overall functions of each unit of the game provision server 120, including the input and output of data.

The communication unit 240 receives data related to games from the user terminals 10 and 15 over the Internet, and sends the situations of games, betting scheduling information and game result data, received from the game provision server 120, to the user terminals 10 and 15.

The game processing module 220 includes a control program for processing a game, and creates game screens using data from the communication unit 240 under the control of the control unit 200 and calculates the results of the game when the game is terminated.

The chatting module 210 enables chatting and the exchange of messages between players in a waiting room or game room of a channel selected by a user or between players connected to the same game server.

When a request command is received from the user terminal 10 or 15, the betting scheduling module 230 classifies various betting actions corresponding to the situation of a relevant game, and sends related data so that a betting schedule setting box can be displayed on the user terminal 10 or 15. Meanwhile, when a specific betting action is selected through input from the user terminal 10 or 15, the betting scheduling module 230 stores data about the action and enables the betting action to be taken by sending the data about the scheduled betting action to the game processing module 220 on the turn of the user of the relevant terminal.

In this case, the betting scheduling module 230 may be configured such that part thereof is installed in the user terminal 10 or 15 and schedule information is stored in the user terminal and is sent to the game processing module 220 over the Internet on a relevant turn.

Figure 3:
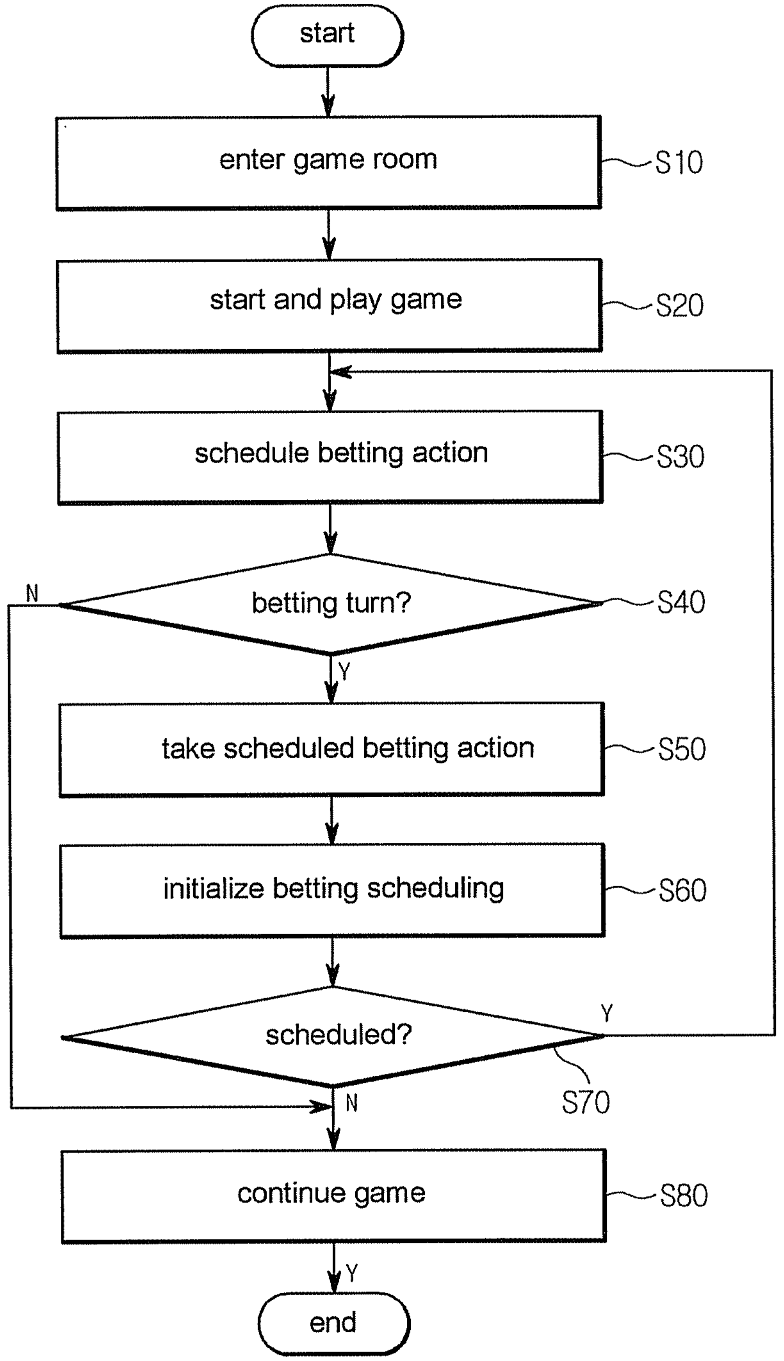
FIG. 3 is a first flowchart showing a method of providing card game services according to a preferred embodiment of the present invention.

FIG. 3 is a first flowchart showing a method of providing card game services according to a preferred embodiment of the present invention. This flowchart shows a method of providing a service in the case in which a single betting schedule setting is made.

First, when a user accesses the game server 100 through the user terminal 10 or 15 and is authenticated as a registered user by entering an ID and a password in a web page displayed on the screen of the user terminal 10 or 15, a web page for the authenticated user is displayed.

When the user selects a desired game through the displayed web page, the channel server 130 sends a channel list, associated with the selected game, and a game room list, belonging to each channel, to the user terminal 10 or 15.

When a desired game room is selected through input from the terminal 10 or 15 at step S10, the game provision server 120 implements a virtual game space to execute a game and sends the virtual game space to the user terminal 10 or 15. Accordingly, when the user enters the game room and at least two players, including the user, are ready to participate in the game at step S20, the game starts. Furthermore, the game will be played according to rules of the game selected by the players.

At step S30, when a player determines his or her betting action in advance during the play of the game, a relevant betting schedule setting is made. For example, in the case of seven poker, when all door cards are dealt to respective players, the players generally place bets in the clockwise direction from the highest-priority player, and the players can place bets on their respective turns. When a betting action to be taken on a relevant turn is determined before the relevant turn with reference to the disclosed cards and betting actions of higher-priority players, a betting schedule setting function implemented in the game room can be executed using input means provided in a terminal, such as a mouse or a keyboard. When the determined betting action is entered through the betting schedule setting function, the betting scheduling module 230 stores information about the betting action and automatically enters and takes the scheduled betting action on a relevant betting turn (see step S40) at step S50.

The number of repetitions of a scheduled betting action can be set at step S30. In the case in which the number of repetitions of a betting action is set to one, a set number of repetitions of a betting action has been taken at step S50, so that the betting schedule setting function is initialized at step S60, thereby preventing the betting action, set at step S30, from being taken. Here, the number of repetitions of a betting action means the number of repetitions of a betting action that can be taken in a single game. Basically, there may be three or more betting stages in a single game, and thus relevant options may be set. When necessary, a setting may be made such that the same betting action is repeatedly taken in a single game room.

Thereafter, after all the players have taken their betting actions at step S80, cards are sequentially dealt to the players from the highest-priority player, and the game continues. When a new betting stage comes, the above-described process is performed again. Meanwhile, when the game is terminated, data about the results of the game is sent to the terminals of respective players so that the data is displayed on the terminals.

Figure 4:
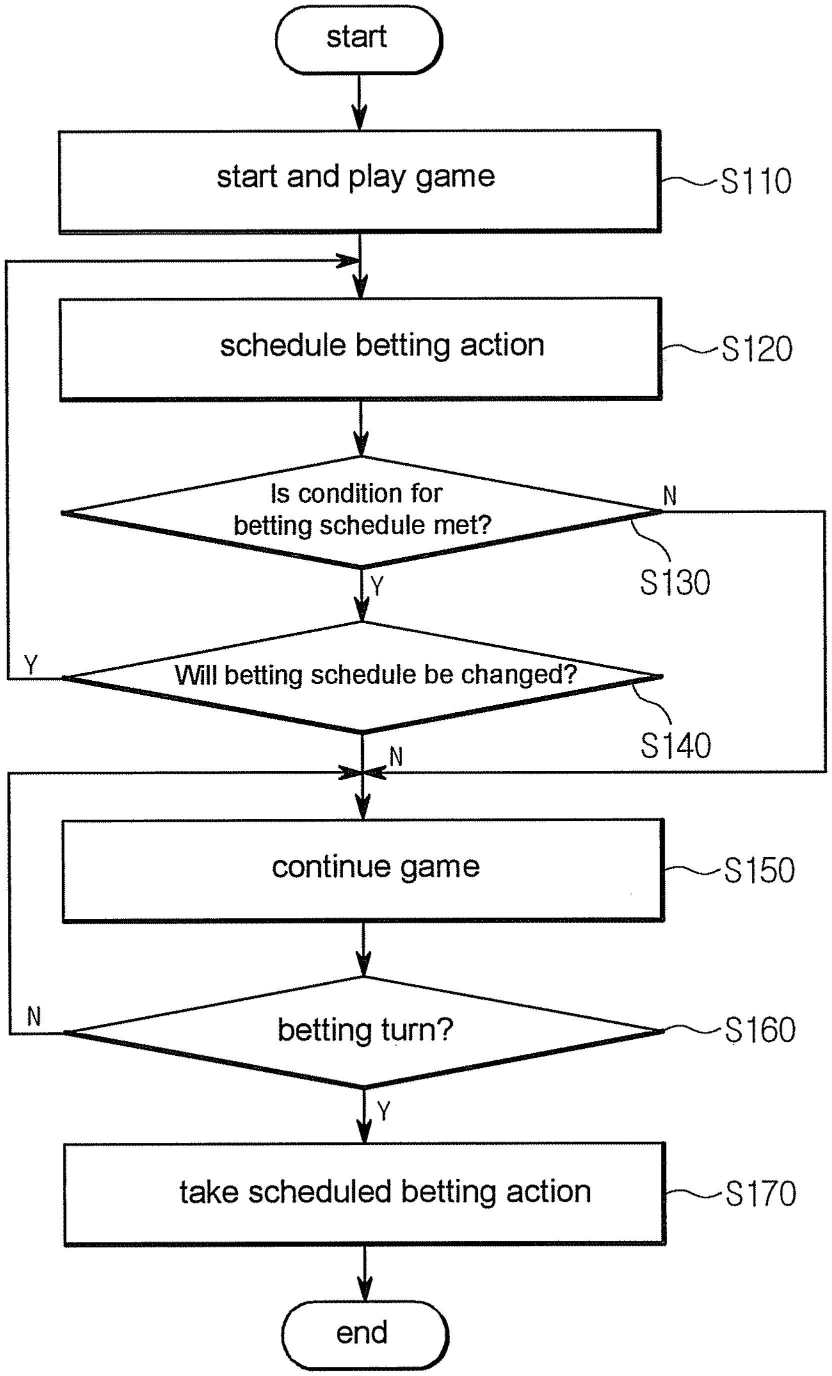
FIG. 4 is a second flowchart showing a method of providing card game services according to a preferred embodiment of the present invention.

FIG. 4 is a second flowchart showing a method of providing card game services according to a preferred embodiment of the present invention. This flowchart shows a method of providing a service in the case in which the current situation of a game differs from the situation that was anticipated at the time of making abetting schedule setting.

The user terminal 10 or 15 accesses the game server 100 and goes through user authentication at step S110. A user selects a desired game from an output list of various games, selects a game room from lists, or sets up a new game room when the channel list of the selected game and the game room list of each channel are output, and enters the game room. When at least one player is ready to participate in the game after the entry of the user, the game starts and is played according to predetermined rules.

When a player desires to determine his or her betting action in advance during the game with reference to the disclosed card and betting situation of the opponent player, the player schedules a determined betting action by executing the betting schedule setting function at step S120. When the betting schedule setting function is executed, a list of one or more betting actions that can be taken by the player in a current situation may appear, and the player may select a desired betting action from the list and enter the betting action. In this case, available betting actions, presented through the betting schedule setting function, may have varying conditions depending on the betting rules of an entered game room and/or the betting situations of opponent players. In this case, respective betting actions, presented through the betting schedule setting function, may be set as listed in the following Table 1, as an example:

TABLE 1

| Betting action | Description |
|---|---|
| fold | give up |
| check | pass without betting (cancel scheduled betting action: when opponent party takes ‘bet’ action) |
| call | accept betting (cancel scheduled betting action: when opponent party takes ‘bet/raise’ action) |
| bet | increase first bet money (cancel scheduled betting action: when opponent party takes ‘bet’ action) |
| raise | additionally place bet in state in which opponent party has placed bet (cancel scheduled betting action: when opponent party takes ‘raise’ action) |
| check/fold | If opponent party takes bet or raise, fold. Otherwise, check. |
| bet/raise | if there is no bet, raise regardless of action of opponent party |
| call any | call regardless of actions of opponent parties |

That is, since available betting actions may be output with reference to the current betting action of the opponent player, the betting schedule setting may be cancelled, or a new setting may be made at step S140 when the betting action of the opponent player's betting action is different from an anticipated action at step S130. For example, if the opponent party takes a ‘bet’ action without taking a ‘fold’ or ‘check’ action in the case in which a ‘check’ action, shown in Table 1, is scheduled, it is determined that the condition for the ‘check’ action is not met, and thus the betting schedule setting is automatically cancelled, or a betting schedule setting box is output again and a new schedule setting is made. Meanwhile, in the case in which a ‘raise’ action is scheduled, the action is scheduled with a view to the case in which the opponent party will take a ‘bet’ action, so that it is determined that the condition for the scheduled ‘raise’ action is not met if the next opponent player takes a ‘raise’ action again.

Thereafter, when the opponent player's anticipated betting action is taken at step S150 and it becomes the turn of the user in question at step S160, the previously scheduled betting action is automatically input and is taken in a game room at step S170.

Figure 5:
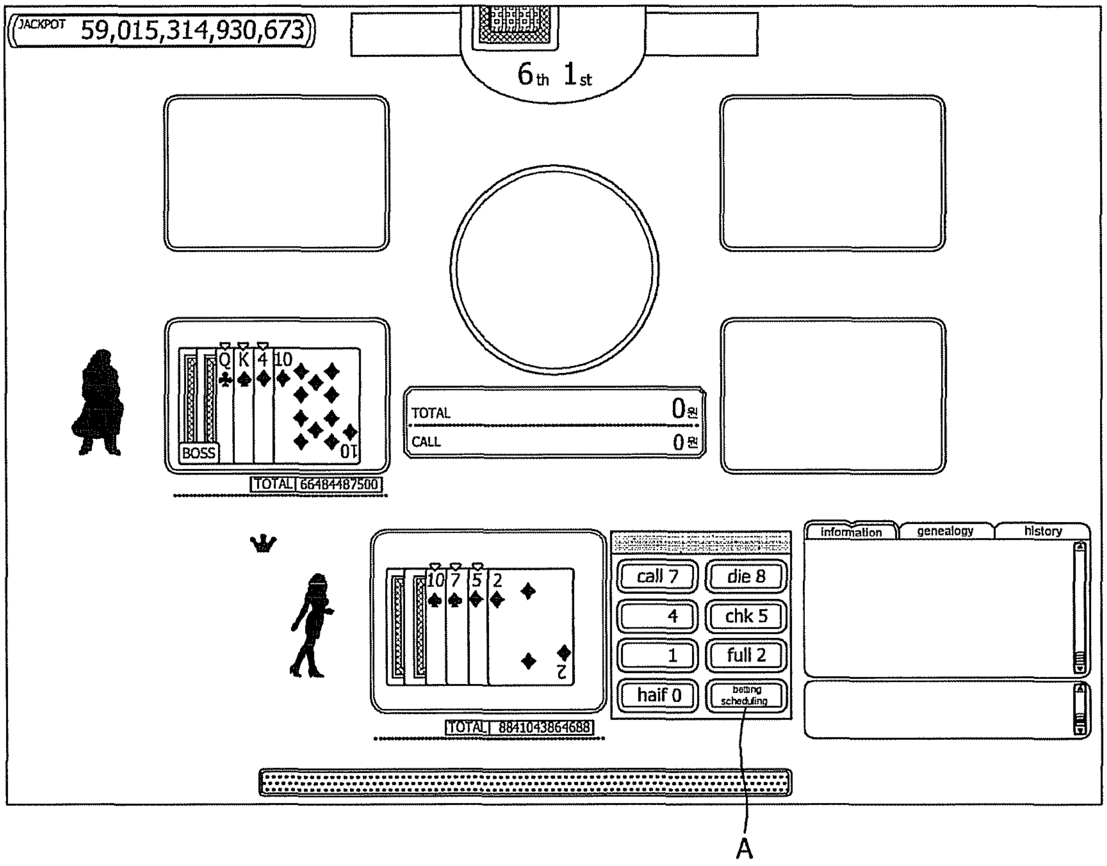
FIG. 5 is a diagram showing an example of a card game service provision screen according to a preferred embodiment of the present invention.

FIG. 5 is a diagram showing an example of a card game service provision screen according to a preferred embodiment of the present invention.

A card game service according to a preferred embodiment of the present invention can implement a game room, which is a virtual game space, such as that shown in FIG. 5. When two or more players, including a player in question, start a game, the game is played while cards are dealt to the players and are sequentially disclosed.

The betting schedule setting function may be performed by selecting and pressing a betting scheduling button (A) among various betting buttons provided in the lower portion of a screen, as shown in FIG. 5. The location of the betting scheduling button (A) is not limited to the upper portion, lower portion, right portion or left portion of the screen, but may be freely changed by a system designer.

Figure 6A:
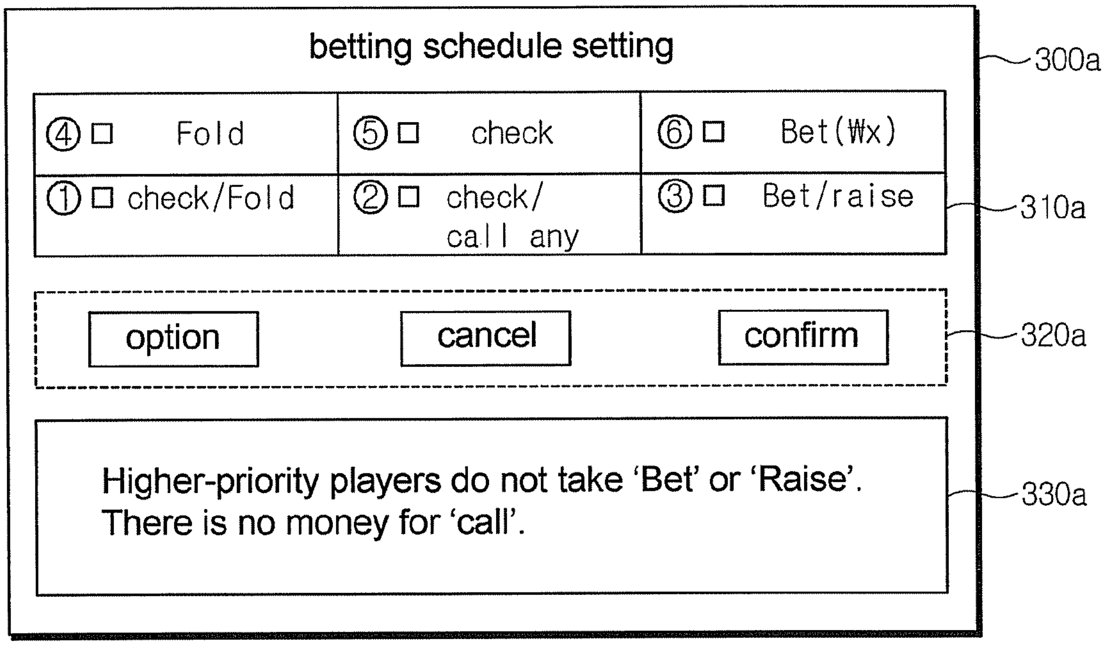
FIGS. 6A and 6B are diagrams showing examples of a betting schedule setting box, which may be displayed on the service provision screen of FIG. 5.
Figure 6B:
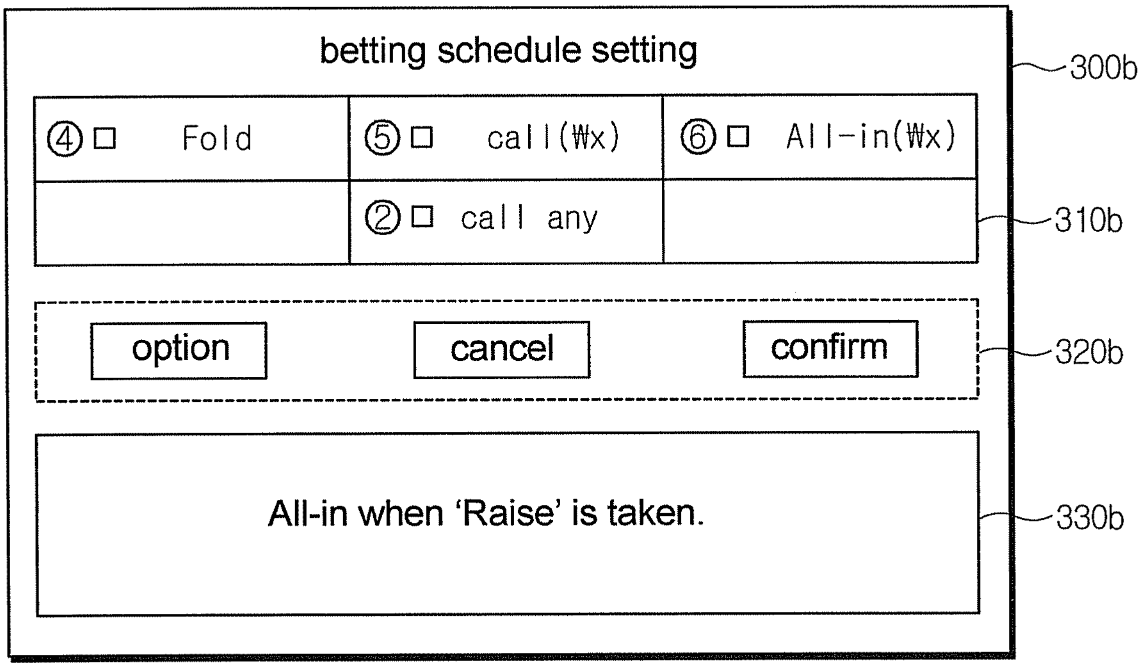

FIGS. 6A and 6B are diagrams showing examples of the betting schedule setting box that may be displayed on the service provision screen of FIG. 5. The betting schedule setting boxes may be displayed when the betting schedule setting function is performed, and FIGS. 6A and 6B indicate that the types of betting actions may vary with the situation of the game.

Referring to FIGS. 6A and 6B, the betting schedule setting boxes 300*a* and 300*b* may be configured to have a structure similar to that of a User Interface (UI) for respective functions, which is implemented on the game room screen of FIG. 5. In greater detail, each of the betting schedule setting boxes 300*a* and 300*b* may include a betting list field 310*a* or 310*b* for showing arranged betting actions available for a current situation and a plurality of function buttons 320*a* or 320*b* for enabling detailed options for a selected betting action to be selected when the desired betting action is selected in the betting list field 310*a* or 310*b*, or enabling input to be completed or cancelled.

The function buttons 320*a* or 320*b* may further include a button for setting the number of repetitions of a scheduled betting action. The setting of the number of repetitions may be included and made as a detailed option for a scheduled betting action. Furthermore, each of the betting schedule setting boxes 300*a* and 300*b* may further include an action description field 330*a* or 330*b* for providing notification of the current situation of the play of a game or notification of a description of or a condition for each betting action selected in the betting list field 310*a* or 310*b*.

Preferably, the respective betting action sections of the betting list fields 310*a* and 310*b* are provided with check boxes having a predetermined size, and thus a desired betting action can be selected by clicking on a relevant check box. Furthermore, shortcut keys assigned to respective betting actions are indicated in front of respective check boxes, and thus each player can conveniently make a setting by pressing a relevant shortcut key when the betting schedule setting box 300*a* or 300*b* is displayed.

The plurality of betting actions appearing in the betting list fields 310*a* and 310*b* shown in FIGS. 6A and 6B are betting actions that are available for the case in which a limit betting rule, which limits the highest amount of betting money, is used as the betting rule of the entered game room in a typical poker game. In the poker game service, a list of available betting actions may vary in the case in which the betting rule differs somewhat from a typical rule or the betting rule is a betting rule that does not limit the highest amount of betting money.

In greater detail, FIG. 6A illustrates a list in the case in which the case where a higher-priority player does not take a ‘bet’ or ‘raise’ action in a game room in which a limit betting rule does not apply is taken as an example. In this case, a ‘fold’ action, for which shortcut key □ is set, is an action indicating that a player will give up a game, so that it is possible to confirm whether the set action will be taken before the action is taken. In the case in which a “bet” action in question is a betting action for which shortcut key □ is set, the amount of money to be bet can be set again. Furthermore, a ‘check/call any’ action, for which shortcut key □ is set, indicates that a player will take a ‘call’ action regardless of the actions of the opponent parties in the case in which a higher-priority player does not take a ‘bet’ action. Even if an opponent party takes a ‘bet’ action or a ‘raise’ action, a 'call' action is automatically entered. When the 'call' action corresponds to 'all-in', the all-in action is automatically taken.

Furthermore, FIG. 6B illustrates a list in the case in which, when a "raise" action is taken, an 'all-in' action is taken. Shortcut key □ may be set for a 'call' action, unlike shortcut key □,, set in FIG. 6A, and shortcut key □ may also be set for an 'all-in' action.

Meanwhile, the embodiments according to the present invention may be implemented in the form of program instructions that can be executed by user terminals, such as computers, and may be recorded in computer-readable recording media. The recording media may include program instructions, a data file, a data structure, or a combination thereof. The recording media may include magnetic media such as a hard disk, a floppy disk and a magnetic tape, optical recording media such as CD-ROM and a DVD, and magneto-optical media such as a floptical disk, and can further include a hardware device capable of storing and executing program instructions, such as ROM, RAM and flash memory. Furthermore, the recording media may be transmission media, including a carrier, light, metallic wire and a wave guide, which transmit signals carrying program instructions and a data structure.

Furthermore, program instructions recorded in the media may be program instructions that are specially designed and constructed for the present invention or can be used by those skilled in the field of computer software. Such program instructions include not only machine language code compiled by a compiler but also high-level language code executed by a computer through a script interpreter. The above-described hardware device may be configured to operate through at least one software module in order to perform the operation of the present invention.

Although the method and system for providing card game services according to the present invention has been described with reference to the exemplary drawings, the present invention is not limited to the embodiments and drawings disclosed in the present specification. It will be apparent to those skilled in the art that the technical spirit of the present invention, that is, the scheme of scheduling betting actions when determining the betting actions while playing a card game in a game room and enabling the betting actions to be automatically entered on relevant turns, may be easily varied and modified within a range that does not depart from the scope of the attached claims.

As described above, the method and system for providing card game services according to the present invention has an advantage in that the time taken to enter betting actions can be significantly reduced by determining and scheduling desired betting actions in advance during the play of a card game and causing the scheduled betting actions to be automatically entered on relevant turns, thereby increasing the speed of the game and increasing interest in the game.

Furthermore, the method and system has an advantage in that a scheduled betting action can be changed depending on the situation of a game, thereby enabling beginning players to become more easily and rapidly adapted to playing the game and providing convenience to general players.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that relative terms are intended to encompass different orientations of the device in addition to the orientation depicted in the Figures.

Moreover, it will be understood that although the terms first and second are used herein to describe various features, elements, regions, layers and/or sections, these features, elements, regions, layers and/or sections should not be limited by these terms. These terms are only used to distinguish one feature, element, region, layer or section from another feature, element, region, layer or section. Thus, a first feature, element, region, layer or section discussed below could be termed a second feature, element, region, layer or section, and similarly, a second without departing from the teachings of the present invention.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Further, as used herein the term "plurality" refers to at least two elements. Additionally, like numbers refer to like elements throughout.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required." Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method to provide of replacing a betting action in advance of a user turn in virtual card game services via a game server, the method comprising:

providing, via the game server, a virtually implemented game room for playing a virtual card game;

providing, via the game server, a user interface configured to receive at least one betting action of a user hand in advance of a turn for the user hand for the at least one betting action in the virtual card game, the at least one betting action being associated with a triggering condition with respect to the virtual card game, the triggering condition being associated with a betting action of a higher-priority opponent player in the virtual card game, comprising:

displaying a set of betting actions consisting of available betting actions for a current play situation of the virtual card game to the user hand according to a betting schedule; and receiving the betting action from the available betting actions selected by the user hand;

instructing a user terminal to store at least part of the received betting action;

receiving, at the game server, the stored betting action over a network;

determining, by the game server according to the betting schedule, whether a situation of the virtual card game meets the triggering condition;

automatically instructing to replace the received betting action with an another betting action received from the user terminal before the turn for the user hand and automatically submitting to the network the another betting action on the turn for the user hand for the at least one betting action in response to the game server determining that the situation of the virtual card game does not meet the triggering condition associated with the at least one betting action, comprising:

displaying an another set of betting actions consisting of available betting actions for a current play situation of the virtual card game to the user hand according to a betting schedule; and receiving the another betting action from the available betting actions selected by the user hand; and submitting the received betting action on the turn for the user hand for the at least one betting action in the virtual card game in response to the game server determining that the situation of the virtual card game meets the triggering condition associated with the at least one betting action.

2. The method as set forth in claim 1, wherein the betting action is established by setting a number of repetitions of the betting action to be received in the virtual card game.

3. The method as set forth in claim 1, wherein the displaying the first set of betting actions available for a current play situation of the virtual card game comprises determining an availability of the one or more betting actions for the current play situation based, at least in part, upon the betting action of the higher-priority opponent player in the current play situation of the virtual card game.

4. The method as set forth in claim 1, wherein the user hand is enabled to select one of one or more betting actions by entering a relevant shortcut key among shortcut keys that have been set for types of betting actions.

5. The method as set forth in claim 1, wherein the user hand is enabled to select one of one or more betting actions by checking a check box, among check boxes that are provided for types of betting actions, using an input device.

6. The method as set forth in claim 1, wherein the automatically instructing to replace the received betting action with the another betting action further comprises canceling the received betting action.

7. The method as set forth in claim 1, wherein the user interface provides a list of play situations of the virtual card game in which the at least one betting action is to be submitted.

8. The method as set forth in claim 1, wherein the user interface enables the user hand to enter own play situations in which the at least one betting action is to be submitted.

9. A non-transitory computer-readable storage medium comprising an executable program, which when executed via a game server, causes replacing a betting action in advance of a user turn comprising the following steps:

providing a virtually implemented game room for playing a virtual card game;

providing a user interface configured to receive at least one betting action of a user hand in advance of a turn for the user hand for the at least one betting action in the virtual card game, the at least one betting action being associated with a triggering condition with respect to the virtual card game, and the triggering condition being associated with a betting action of a higher-priority opponent player in the virtual card game, comprising:

displaying a set of betting actions consisting of available betting actions for a current play situation of the virtual card game to the user hand according to a betting schedule; and receiving the betting action from the available betting actions selected by the user hand;

instructing a user terminal to store at least part of the received betting action;

receiving the stored at least one betting action over a network;

determining, according to the betting schedule, whether a situation of the virtual card game meets the triggering condition;

automatically instructing to replace the received betting action with an another betting action received from the user terminal before the turn for the user hand and automatically submitting the another betting action on the turn for the user hand for the at least one betting action in response to determining that the situation of the virtual card game does not meet the triggering condition associated with the at least one betting action, comprising:

displaying an another set of betting actions consisting of available betting actions for a current play situation of the virtual card game to the user hand according to a betting schedule; and receiving the betting action from the available betting actions selected by the user hand; and submitting the received betting action on the turn for the user hand for the at least one betting action in the virtual card game in response to determining that the situation of the virtual card game meets the triggering condition associated with the at least one betting action.

10. A system to replace a betting action in advance of a user turn in virtual card game services, comprising:

at least one memory configured to store program instructions and databases, the databases comprising at least one virtual game rule;

a communication unit configured to connect a user hand to a virtually implemented game room for playing a virtual card game;

a user interface configured to receive at least one betting action in advance of a turn for the user hand for the at least one betting action, the at least one betting action being associated with a triggering condition with respect to the virtual card game being played, and the triggering condition being associated with a betting action of a higher-priority opponent player in the virtual card game being played; and a betting schedule module configured to instruct to store at least part of the at least one betting action in a user terminal, configured to automatically replace the stored betting action according to reception of another betting action from the user terminal before the turn for the user hand and automatically submit the another betting action on the turn for the user hand for the at least one betting action in response to a situation of the virtual card game not meeting the triggering condition associated with the at least one betting action, and configured to receive the betting action over a network from the user terminal to submit the received betting action on the turn for the user hand for the at least one betting action in the virtual card game in response to the situation of the virtual card game meeting the triggering condition associated with the at least one betting action, wherein the user interface is configured:

to display a set of betting actions consisting of available betting actions for a current play situation of the virtual card game to the user hand according to a betting schedule, and to receive the betting action from the available betting actions selected by the user hand.

11. The system as set forth in claim 10, wherein the betting schedule is configured to cancel the betting action if the situation of the virtual card game in which the user terminal participates does not meet the triggering condition associated with the at least one betting action.

12. The method as set forth in claim 1, wherein the providing the user interface comprises receiving the at least one betting action on a turn of a higher-priority player in the virtual card game.

13. The system as set forth in claim 10, wherein the user interface is configured to enable the user to enter the at least one betting action on a turn of a higher-priority player in the virtual card game.

14. The system as set forth in claim 10, wherein the user interface is configured to display the at least one betting action along with a description of the triggering condition associated with the at least one betting action.

15. The system as set forth in claim 10, wherein the at least one betting action is at least one of fold, check, bet, and raise.

* * * * *